United States Patent
Nakano et al.

(10) Patent No.: US 6,639,903 B2
(45) Date of Patent: Oct. 28, 2003

(54) TRANSMISSION SYSTEM BETWEEN BASE STATION AND SWITCHING CENTER OF MOBILE COMMUNICATIONS USING FIXED LENGTH CELL

(75) Inventors: Masatomo Nakano, Suginami-ku (JP); Masafumi Onuki, Setagaya-ku (JP); Hiroshi Nakamura, Nerima-ku (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 10/099,371

(22) Filed: Mar. 14, 2002

(65) Prior Publication Data

US 2002/0093939 A1 Jul. 18, 2002

Related U.S. Application Data

(63) Continuation of application No. 08/849,963, filed as application No. PCT/JP96/03227 on Nov. 5, 1996, now Pat. No. 6,442,149.

(30) Foreign Application Priority Data

Nov. 6, 1995  (JP) ............................................... 7-287553

(51) Int. Cl.[7] .............................. H04B 7/00; H04J 3/00; H04L 12/56
(52) U.S. Cl. .................. 370/310.2; 370/336; 370/395.1
(58) Field of Search ........................... 370/310.2, 310.1, 370/328, 329, 395.1, 395.4, 395.42, 338, 468, 470, 474, 336, 347

(56) References Cited

U.S. PATENT DOCUMENTS

| 5,420,863 A | 5/1995 | Taketsugu et al. |
| 5,452,330 A | 9/1995 | Goldstein |

FOREIGN PATENT DOCUMENTS

| EP | 372 795 | 6/1990 |
| EP | 662 778 | 7/1995 |
| JP | 2-260845 | 10/1990 |
| JP | 3-297245 | 12/1991 |
| JP | 6-30033 | 2/1994 |
| JP | 6-30460 | 2/1994 |

*Primary Examiner*—Chau Nguyen
*Assistant Examiner*—Soon-Dong Hyun
(74) *Attorney, Agent, or Firm*—Brown Raysman Millstein Felder & Steiner LLP

(57) ABSTRACT

An improvement of an ATM transmission system between a mobileservices switching center and a base station in a mobile communication system. A delay time for generating/sending out a cell is minimized to ensure the information quality required for real time transmission. When the transmission interval of a call type a is T, call types b and c whose periods are twice and four time that of the call type a should be transmitted at intervals twice and four times that of the call type a. A transmitted frame assembler/disassembler 104 in the base station prepares transmitted frames 201 each including the cell slots 201-1, 201-2 and 201-3 for transferring the respective call types, and schedules such that the transmitted frames are sent out to a channel 112 at the interval T, thereby enabling the transmission to be carried out without delay.

12 Claims, 13 Drawing Sheets

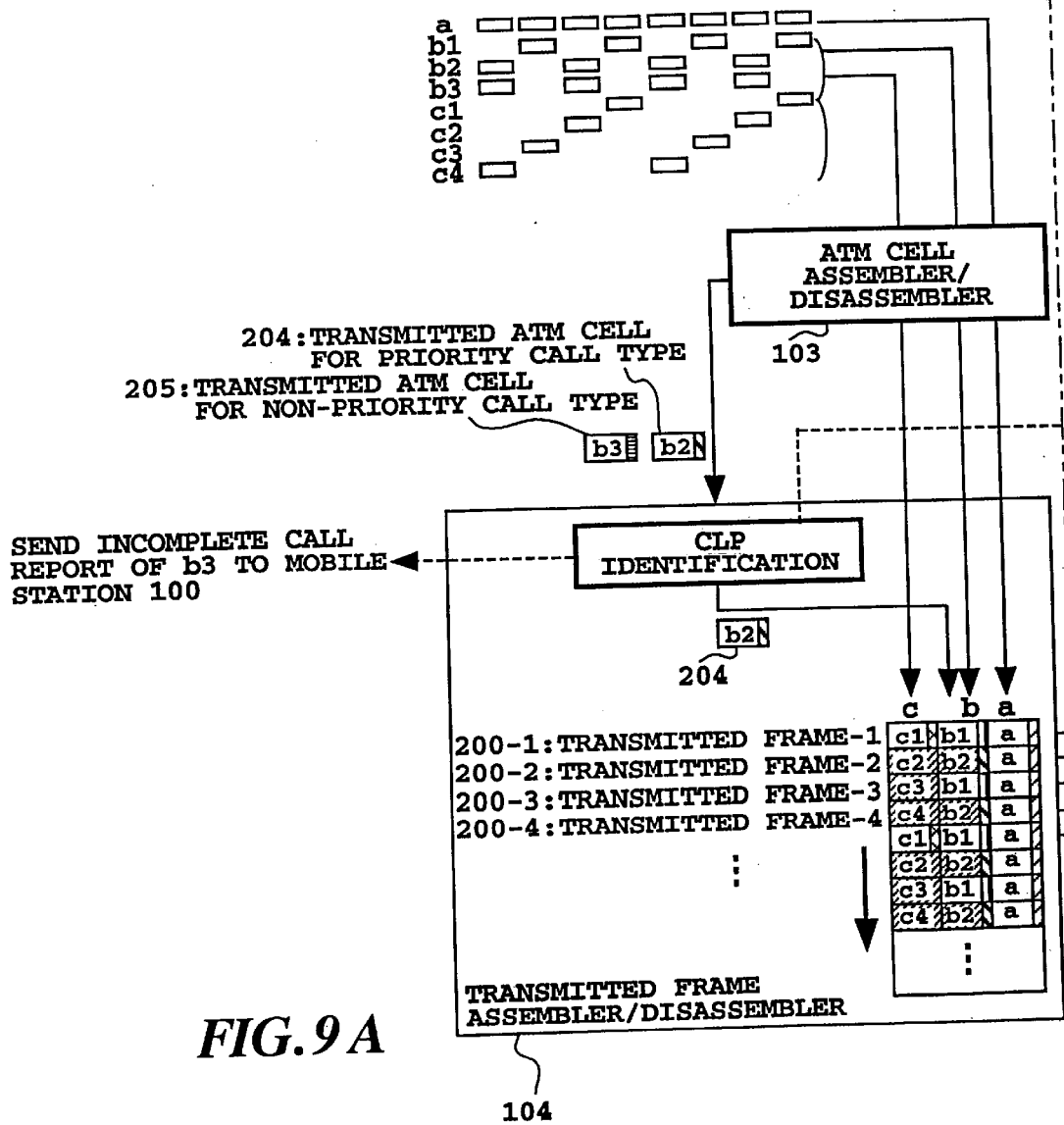

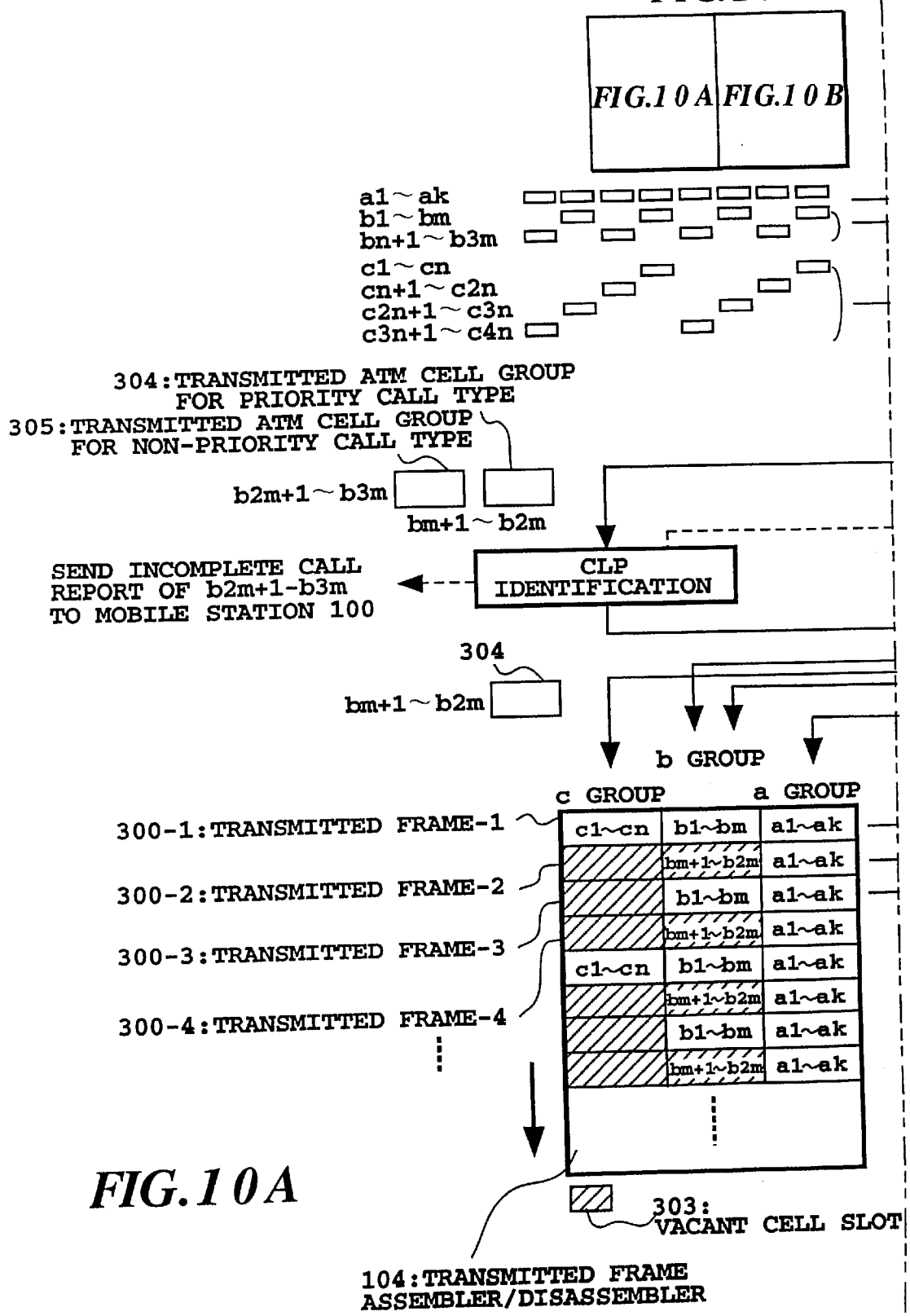

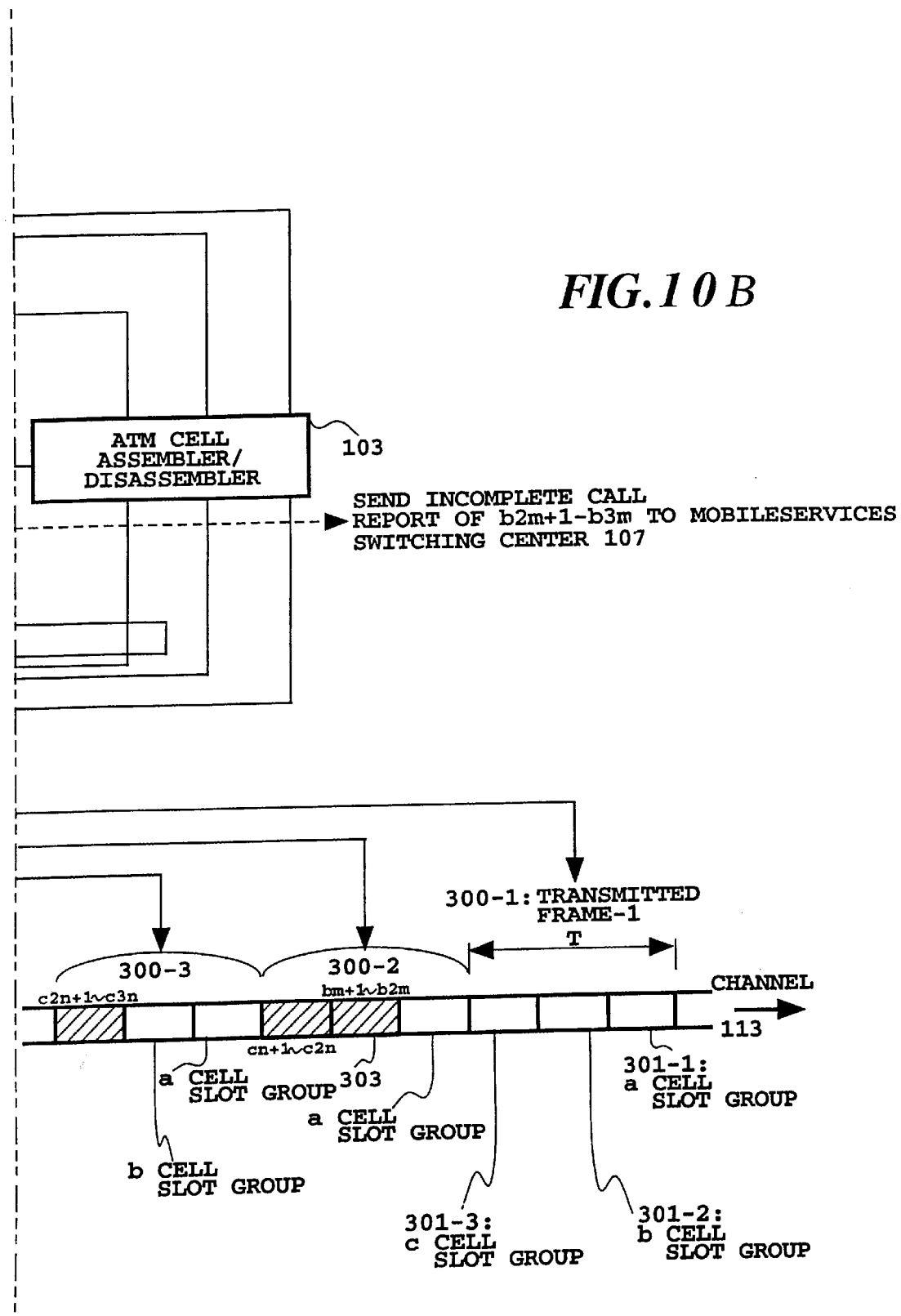

TRANSMISSION SYSTEM BETWEEN BASE STATION AND SWITCHING CENTER OF MOBILE COMMUNICATIONS USING FIXED LENGTH CELL

This application is a continuation of U.S. patent application Ser. No. 08/849,963, filed Jun. 6, 1997, which issued as U.S. Pat. No. 6,442,149 on Aug. 27, 2002, which is a national stage application of PCT/JP96/03227, filed Nov. 5, 1996, which claims priority of JP 7/287553, filed Nov. 6, 1995.

TECHNICAL FIELD

The present invention relates to structuring channels between a mobileservices switching center and base stations in mobile communications using ATM (Asynchronous Transfer Mode), and more particularly to a system which periodically transfers ATM cells generated for each of a plurality of call types by means of a frame consisting of multiple cell slots.

BACKGROUND ART

Establishing channels between a mobileservices switching center and base stations using ATM (Asynchronous Transfer Mode) has been conventionally implemented. In this case, it is necessary to send multiple connections of cells from a base station to the mobileservices switching center through the same channel. Sending ATM cells over the same channel presents various problems because the base station handles speech information from mobile stations with severe delay condition at low CBR (constant bit rate).

One of the conventional techniques sequentially transmits, under competitive control, a plurality of connections of ATM cells carrying the same call type over the same channel. This is shown in FIG. 1.

The transmission system under the competitive control as shown in FIG. 1 inevitably results in waiting delay for transmission regardless of the ball types when the competitive control is carried out.

DISCLOSURE OF THE INVENTION

The object of the present invention is to reduce mismatch between the generation timing and transmission timing of a cell or waiting time for transmission as much as possible by periodically transmitting a frame consisting of cell slots prepared to send each of fixed length cells (ATM cells) bearing information about a call type of the same kind or call types different in information transfer rates and so on.

This makes it possible to minimize the delay from the generation to the transmission of the cells, and to ensure the quality in voice or real time information transmission.

According to a first aspect of the present invention, the cells of the same and different call types are transmitted periodically using a frame consisting of cell slots matching the cell generation timings which differ among the same and different call types. Using this frame can reduce the delay involved in sending out cells.

In the transmission above, if the number of calls exceeds the number of cell slots prepared for respective call types, an incomplete call will result because of the lack of transmission means.

According to a second aspect of the present invention, a cell slot which is conventionally a vacant slot and not used for information transfer is utilized as a shared cell slot available among the plurality of call types so that a fixed length cell (ATM cell) of an overflowed call is transmitted by the shared cell slot. Thus using the shared cell slot makes it possible to increase the information transfer efficiency of a channel.

The transmission of the overflowed call using the shared cell slot will sometimes result in an incomplete call regardless of a priority call or a non-priority call when the number of calls exceeds the number of available shared cell slots in the shared slots.

According to a third aspect of the present invention, the probability that the priority call ends with the incomplete call can be reduced by assigning the shared slot to the call in accordance with its priority in the overflowed calls, and by transmitting it.

BRIEF DESCRIPTION OF THE DRAWINGS

FIGS. 9A and 9B are diagrams illustrating the embodiment 3 applied to a case which handles only one call for each of different call types; and FIGS. 10A and 10B are diagrams illustrating the embodiment 3 applied to an extended case which handles a plurality of calls for each of different call types.

BEST MODE FOR CARRYING OUT THE INVENTION

The embodiments of the invention will now be described with reference to the accompanying drawings.

Figure 2A:
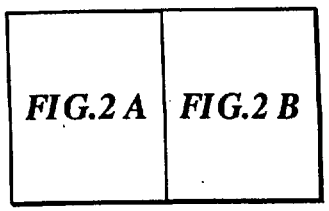
FIGS. 2A and 2B are block diagrams showing a mobile communication system in accordance with the present invention.
Figure 2A:
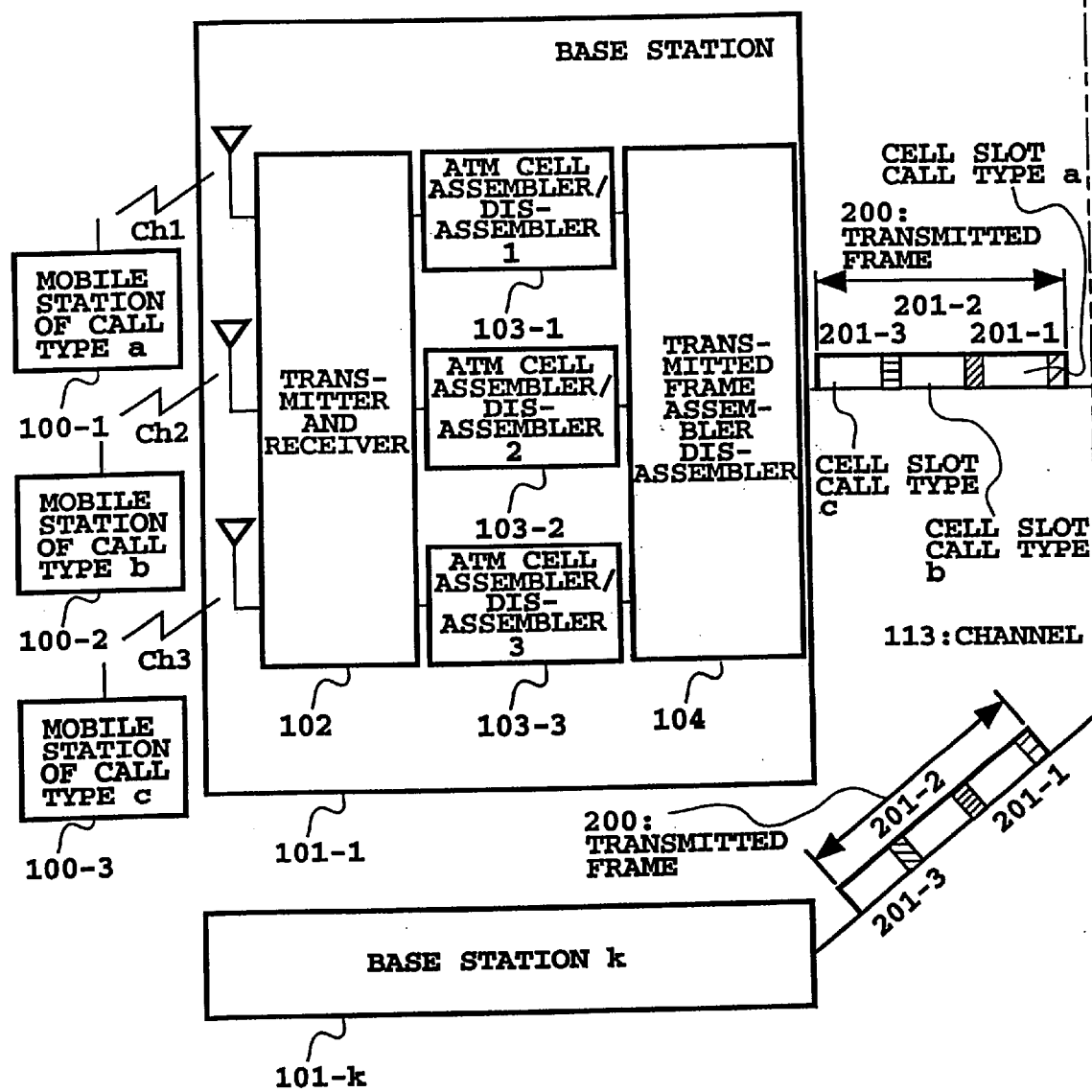
Figure 2B:
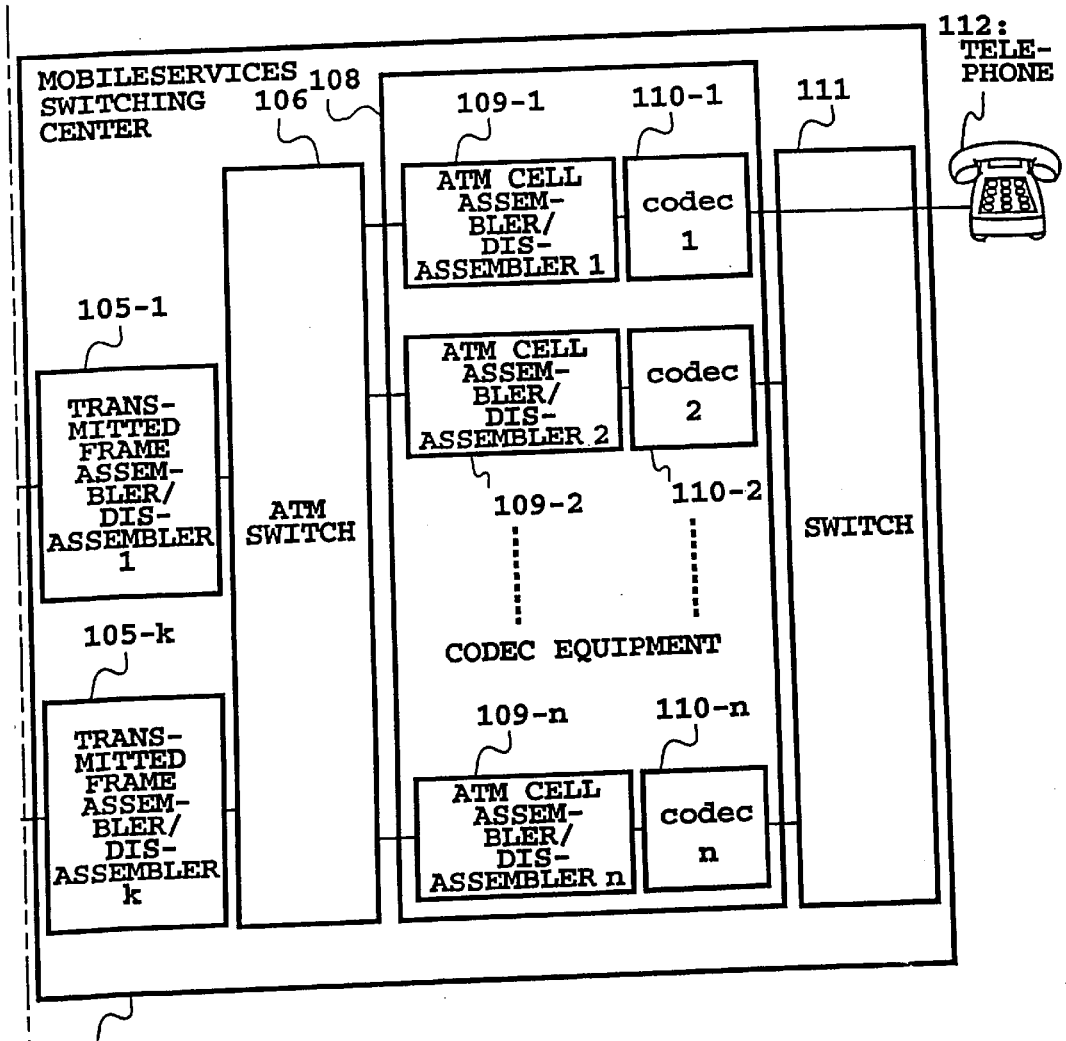

FIGS. 2A and 2B show an embodiment of a mobile communication system in accordance with the present invention. In FIGS. 2A and 2B, the reference numeral 100 designates mobile stations, 101 designates base stations, and 102 designates a transmitter and receiver. The reference numeral 107 designates a switching center in the mobile communication system. The reference numerals 103 and 109 designate ATM cell assembler/disassemblers in the base station 101 and the mobileservices switching center 107. The reference numeral 104 designates a transmitted frame assembler/disassembler in the base station 101, which has a function of placing ATM cells generated by the ATM cell assembler/disassemblers 103 in predetermined positions in a transmitted frame in accordance with the call types to be transmitted, and a function of picking up ATM cells by disassembling a received transmitted frame. The reference numeral 105 designates transmitted frame assembler/disassemblers in the mobileservices switching center 107, which transmit and receive transmitted frames 200 in synchronism with the transmitted frame assembler/disassembler 104 in the base station 101. The reference numeral 108 designates codec equipment including the ATM cell assembler/disassemblers 109 and codecs 110 in the mobileservices switching center 107 for carrying out code conversion. The reference numeral 111 designates a switch for connecting a telephone 112 with one of the ATM cell assembler/disassemblers 109 in the mobileservices switching center 107. The reference numeral 112 designates a telephone, and 113 designates channels for transmitting the transmitted frames 200.

The operation of the units and circuits, and the flow of communication signals conveyed over channels of the respective embodiments in accordance with the present invention will now be described with reference to FIGS. 2A and 2B.

The mobile stations 100-1, 100-2 and 100-3 with different call types of communications are moving in the radio zone controlled by the base station 101-1, thus carrying out communications. In this case, radio channels have been selected for the communications between the respective mobile stations 101 and the transmitter and receiver 102 in the base station 101-1. In addition, ATM links have been established between the ATM cell assembler/disassemblers 103 in the base station and the ATM cell assembler/disassemblers 109 in the mobileservices switching center to enable the communications. It is further assumed that the switch 111 is set to connect the codec 110-1 with the telephone 112, for example.

A coded signal of a call type a transmitted from the mobile station 100-1 is passed through a radio channel ch1, received by the transmitter and receiver 102 in the base station 101-1, and divided into cells by the ATM cell assembler/disassembler 103-1, to carry out the transmission by the ATM cell. Similar processings are carried out with the mobile stations 100-2 and 100-3 so that the respective ATM cells are sent to the transmitted frame assembler/disassembler 104.

The transmitted frame assembler/disassembler 104 places the ATM cells on the cell slots prepared for transmitting the ATM cells of different call types, and assembles them into transmitted frame 200 at every interval T to be transmitted periodically.

The transmitted frame 200 is transferred through the channel 113, and is synchronously received by one of the transmitted frame assembler/disassemblers 105 in the mobileservices switching center 107, in which the transmitted frame 200 is disassembled into ATM cells. The disassembled ATM cells are transferred to an ATM switch 106.

The ATM cells are routed to the ATM cell assembler/disassemblers 109 in accordance with the ATM headers by the ATM switch 106. The routed ATM cells are converted into coded signals by the ATM cell assembler/disassemblers 109 and are decoded into voice codes by the codecs 110. The voice signals decoded by the codecs are sent to the telephone 112, for example, through the switch 111.

On the other hand, a signal from the telephone 112 is transmitted to a mobile station 100-1 through a similar processing.

Thus, the foregoing operation enables the communications between the mobile station and the telephone.

Next, generating methods will be described of the transmitted frames in the mobile communication system thus configured in accordance with the present invention.

Embodiment 1

A case (embodiment 1) will now be described in which the same call type (which has the same transfer period) is transferred using the transmitted frame.

Let us assume that there are three calls a, b and c of the same type, and their information generating periods are the same, which is T. The processing time is the same which is required for the information to be placed into the payload of a fixed length packet such as the ATM cell because they have the same call type.

To transmit the three calls a, b and c over the same channel, transmitted frames 200-1–200-4 are prepared in the transmitted frame assembler/disassembler 104. Each transmitted frame includes transmitted slots such as 201-1–201-3 for transferring the ATM cells corresponding to the calls. The transmitted frames are generated by the transmitted frame assembler/disassembler 104 at every interval T to be sent over the channels.

Figure 3:
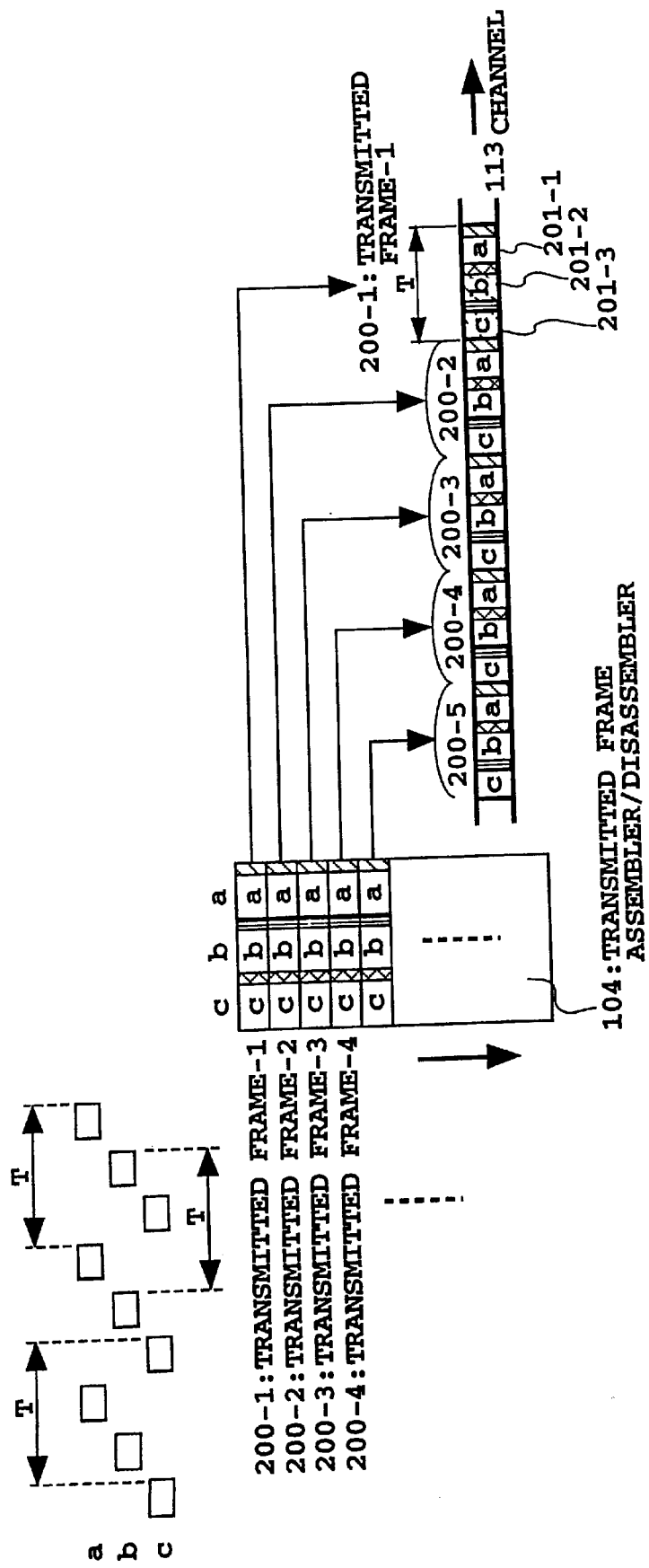
FIG. 3 is a diagram illustrating transmission algorithm of the same call type.

The calls a, b and c are controlled such that they are generated with their phase shifted by T/3 interval as shown in FIG. 3, thereby being placed on the frame without delay. Thus generating the calls with their phase shifted makes it possible for the information of the calls to be assembled into the transmitted frames and transferred at the interval T without delay or collision.

Embodiment 2

Next, referring to FIGS. 4 and 5, the algorithm of assembling operation of the transmitted frame assembler/disassembler 104 will be described.

Figure 4:
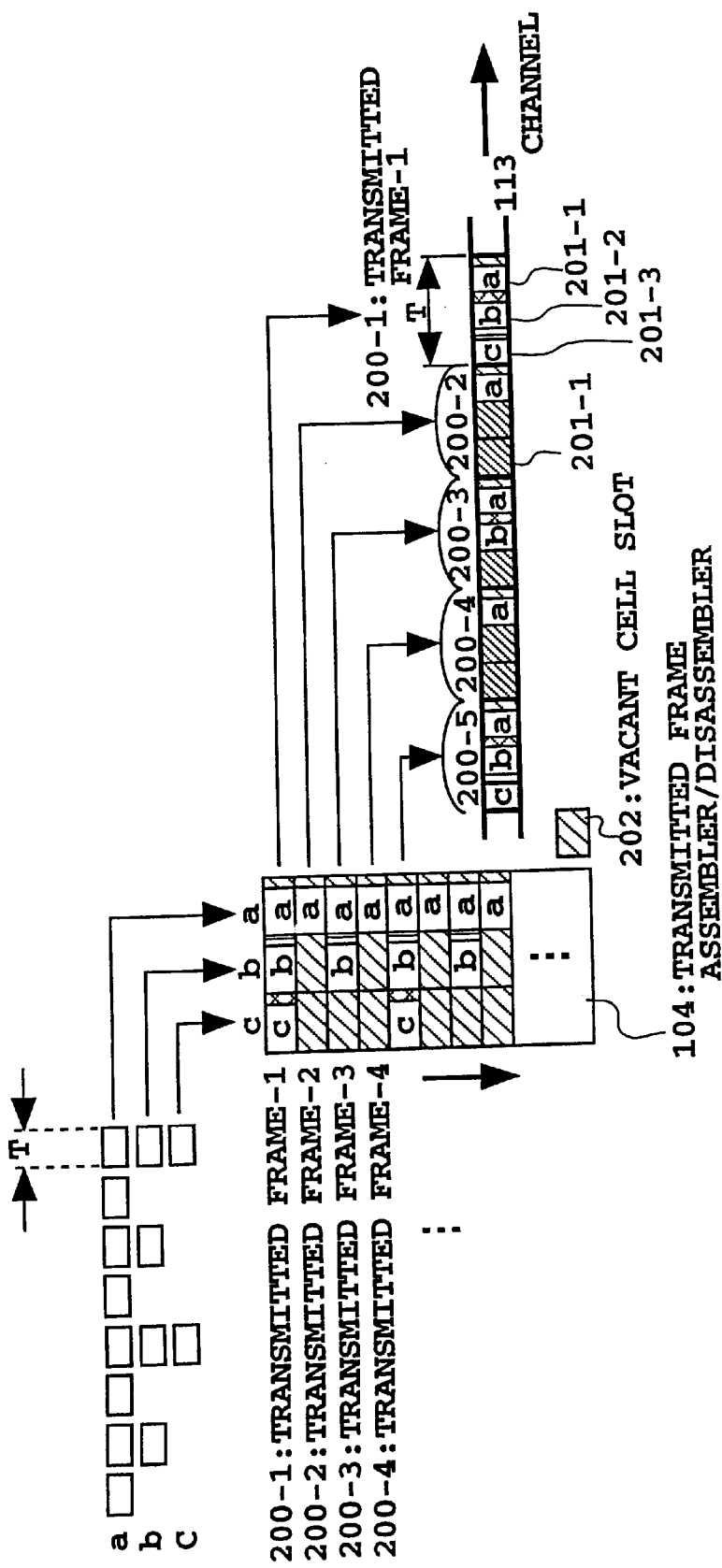
FIG. 4 is a diagram illustrating transmission algorithm of different call types.

FIG. 4 is a diagram illustrating the transmission algorithm applied to a case where there is only one call for each of the different call types. In FIG. 4, the reference numeral 200 designates transmitted frames, each of which accommodates a fixed number of cell slots 201 and is transmitted at the fixed interval T, and 201 designates cell slots reserved for transmitting the ATM cells of respective call types.

Let us assume that there are three call types a, b and c.

Furthermore, it is assumed that they have different information transfer rates (the other conditions such as quality required for the transmission are assumed to be the same), and that the information transfer rates have the following simple ratios.

a:b:c=4:2:1

The ratios of intervals required for the information to be placed into the ATM cell payloads are as follows (this holds true when a fixed length packet is used instead of the standard ATM cell as a transmitting medium).

a:b:c=1:2:4

To transmit the call types a, b and c without delay over the same channel, they must be placed on the transmission line at the following periods.

a:b:c=1:2:4

If the transmission period of the call type a is T, it is necessary for the call types b and c to be transmitted at the periods twice and four times the period of a. This can be implemented by preparing in the transmitted frame assembler/disassembler 104 the transmitted frame 200 consisting of cell slots 201-1, 201-2 and 201-3 for transferring the respective call type cells at every transfer period as shown in FIG. 4 so that the transmitted frames are scheduled to be sent over the channel 113 at every interval T without delay.

In FIG. 4, if there appears no cell for transferring the call types a, b and c during the frame transmission interval T, a dummy cell is inserted to form a vacant cell slot 202.

Figure 5:
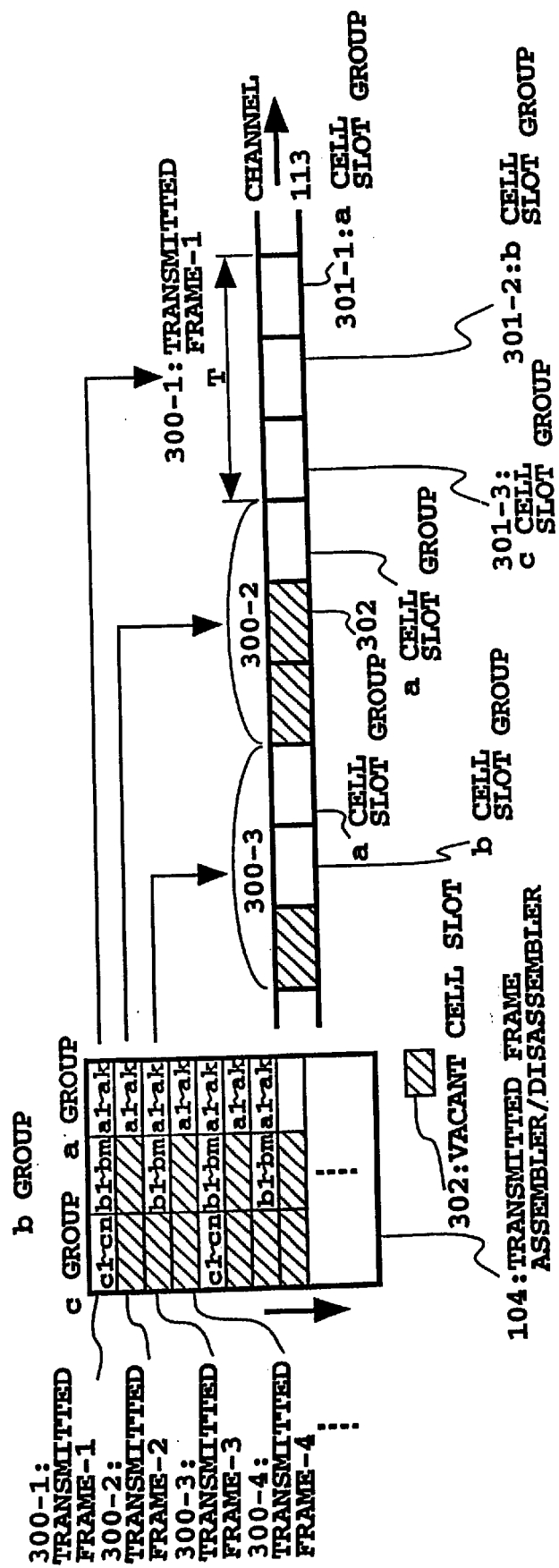
FIG. 5 is a diagram illustrating transmission algorithm extended to a plurality of calls of different types.

FIG. 5 is a diagram illustrating the transmission algorithm extended to be applied to a plurality of calls for each of the different call types. In FIG. 5, the reference numeral 300 designates transmitted frames which accommodate the same number of cell slot groups as that of the call types and are transferred at the fixed interval T. The reference numeral 301 designates cell slot groups each consisting of a plurality of consecutive cell slots reserved in advance for transferring the ATM cells conveying the respective call types.

As in FIG. 4, let us assume that there are three call types a, b and c, and they have different information transfer rates (the other conditions such as quality required for the transmission are assumed to be the same) as follows.

a:b:c=4:2:1

In this case, the ratios of time periods required for the information to be placed into the ATM cell payloads are as follows as in FIG. 3 (this holds true when a fixed length packet is used instead of the standard ATM cell as a transmitting medium).

a:b:c=1:2:4

As shown in FIG. 5, the transmitted frame 300 including cell slot groups consisting of transmitted cell slots of the same call type is prepared only when a plurality of calls of the same call type occur at the same time. The transmitted frames can be scheduled to be sent over the channel 113 at every interval T without delay.

In FIG. 5, if no cell slot group appears for transferring the call types a, b and c during the frame transmission interval T of the transmitted frame, a dummy cell is inserted to form a vacant cell slot group 302.

Embodiment 3

In the foregoing transmission method, if the number of calls exceeds the number of cell slots for respective call types or the number of cell slots prepared for the cell slot group, it is inevitable that some calls become an incomplete call because they have no transmission means.

An embodiment will now be described which can improve the information transfer efficiency by transmitting overflowed calls even if the number of calls exceeds the number of cell slots for respective call types or the number of cell slots prepared for the cell slot group, thereby completing the transmission of the overflowed calls.

This embodiment is also applied to the mobile communication system as shown in FIGS. 2A and 2B.

Figure 6:
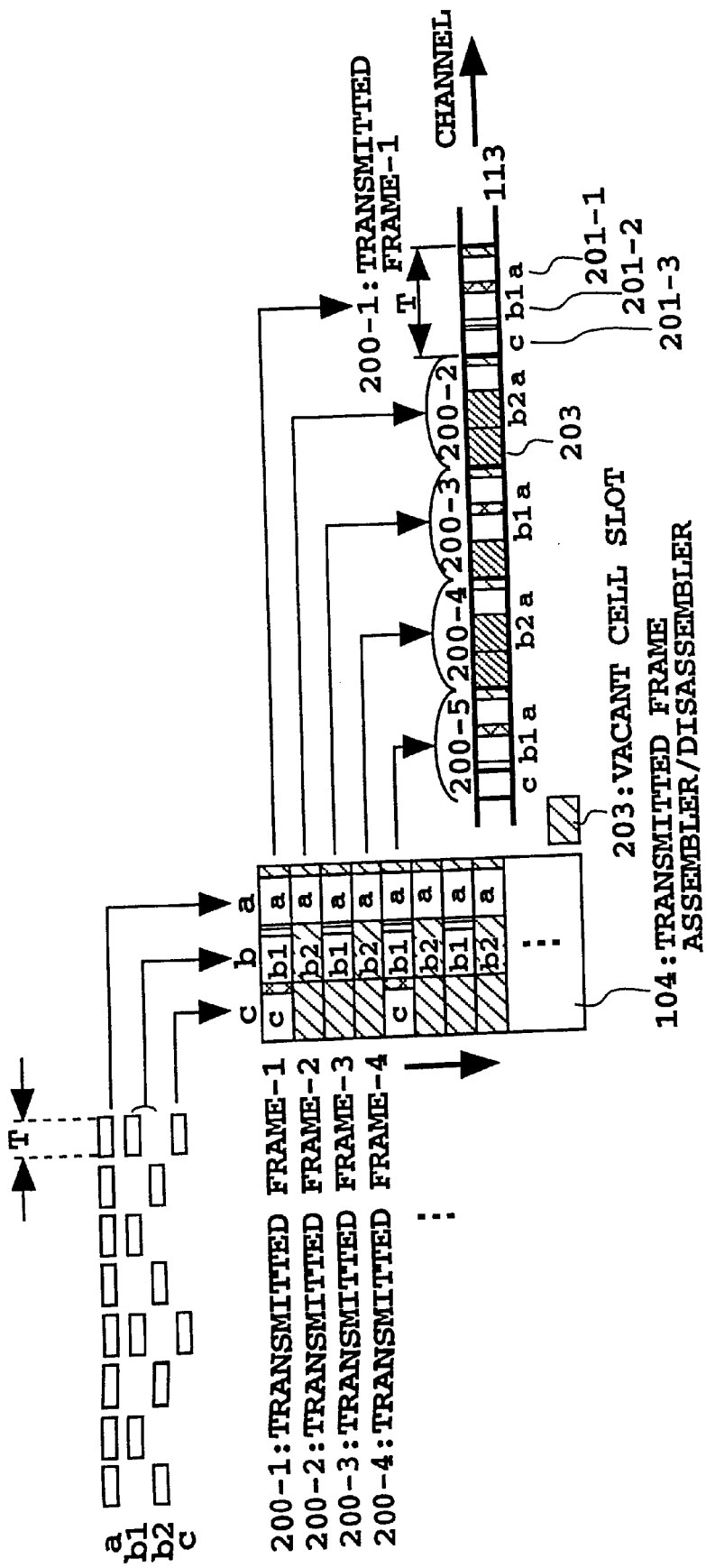
FIG. 6 is a diagram illustrating an embodiment 3 applied to a case which handles only one call for each of different call types.

FIG. 6 is a diagram illustrating the transmission algorithm of the present embodiment, which handles one call for each of the different call types in the mobile communication system as shown in FIGS. 2A and 2B. In FIG. 6, the reference numeral 200 designates transmitted frames which accommodate a fixed number of cell slots 201 and shared cell slots 203, and are transmitted at a fixed interval T. The reference numeral 201 designates cell slots reserved in advance for transmitting the ATM cells conveying the respective call types. The reference numerals 203 designates shared slots which are used instead of the cell slots 201 in the case where a call occurs and the cell slots 201 for that call type have already been used for the communication.

The algorithm of the assembling operation of the transmitted frame assembler/disassembler 104 will now be described with reference to FIG. 6.

The conditions of the call types a, b and c are the same as those of the embodiment as shown in FIG. 4.

Accordingly, when the transfer period of the call type a is T, the call types b and c can be transmitted at periods equal to twice and four times the period T, respectively. This can be implemented by preparing in the transmitted frame assembler/disassembler 104 shown in FIGS. 2A and 2B the transmitted frames 201 each consisting of the cell slots 201-1, 201-2 and 201-3 for transferring the respective call type cells as in FIG. 4 so that the transmitted frames are scheduled to be sent over the channel 113 at every interval T without delay.

In FIG. 6, one call per call type a, b or c is assumed as in FIG. 4. However, if a new call occurs for the call types b and c, a shared cell slot 203 is reserved to transfer the new call in FIG. 6. The shared cell slot enables the new call to be transferred without delay.

Figure 7:
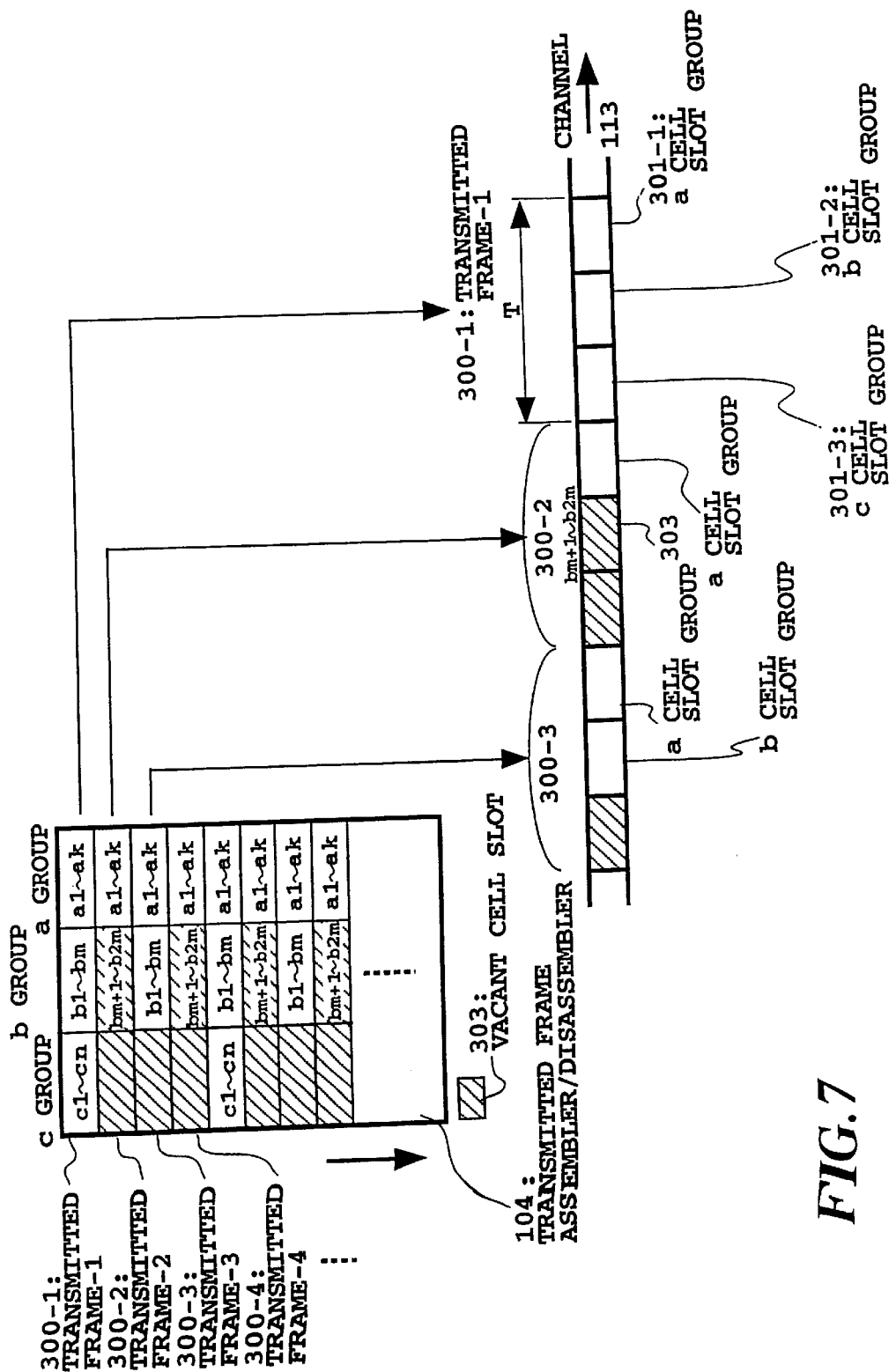
FIG. 7 is a diagram illustrating the embodiment 3 applied to an extended case which handles a plurality of calls for each of different call types.

FIG. 7 is a diagram illustrating an extended transmission algorithm applied to a plurality of calls for each of the different call types. In FIG. 7, the reference numeral 300 designates transmitted frames which accommodate the same number of cell slot groups 301 and shared cell slot groups 303 as that of the call types, and which are transferred at the fixed interval T. The reference numeral 301 designates cell slot groups each consisting of a plurality of consecutive cell slots reserved in advance for transferring the ATM cells conveying the respective call types. The reference numeral 303 designates the shared cell slot groups used instead of the cell slot groups 301 when there is no vacant cell slot because the cell slot groups 301 have already been used up which are to be employed for transferring the call type at the occurrence of the call.

As in the case described in connection with FIG. 6, which handles one call per call type, handling a plurality of calls per call type enables greater number of calls to be transmitted than in the first embodiment by using the vacant cell slot groups 302 as the shared slot groups 303 when no available assigned cell slot is present in the cell slot groups used for ordinary transmission.

Embodiment 4

In the transmission of the overflowed call using the shared cell slots or the shared cell slot groups described in the embodiment 3, an incomplete call will occur if the number of calls exceeds the number of the available shared cell slots in the shared cell slot groups.

In this embodiment, a shared cell slot is assigned to an overflowed call in accordance with its priority when the number of calls exceeds the number of available shared slots prepared in the shared cell slots or the shared cell groups, thereby being transmitted in preference. This makes it possible to reduce the probability that the priority call ends with an incomplete call.

Figure 8:
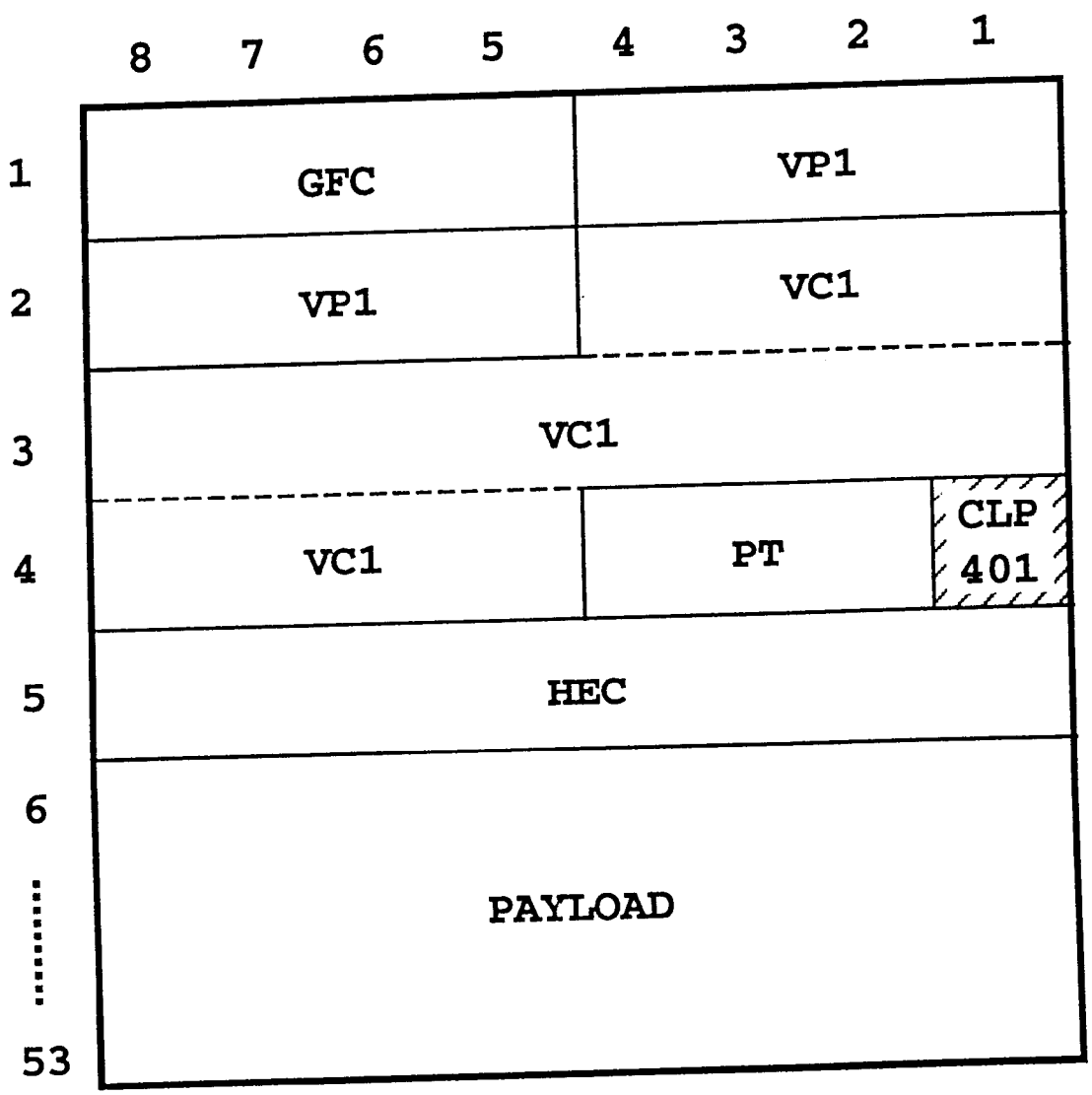
FIG. 8 is a diagram showing an ATM header.

The priority call will now be described. FIG. 8 shows the ATM header, in which the reference numeral 401 designates CLP (Cell Loss Priority) standardized by ITU-T, an identifier for identifying the priority of the cell. Thus, the CLP of the ATM header enables the priority of the cell to be identified, and when the bit of the CLP is set, the cell is handled as a low priority cell. When the channels aggregate, the cell with its CLP bit being set is relinquished first. In other words, the priority call is a call whose CLP bit is not set in its ATM cell header.

Figure 1:
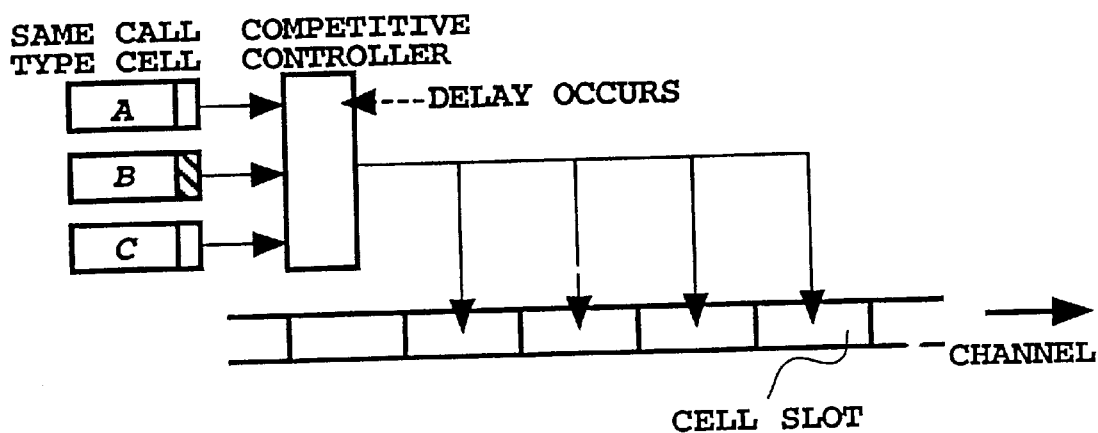
FIG. 1 is a diagram illustrating a conventional method for sending a plurality of call ATM cells over the same channel.
Figure 9B:
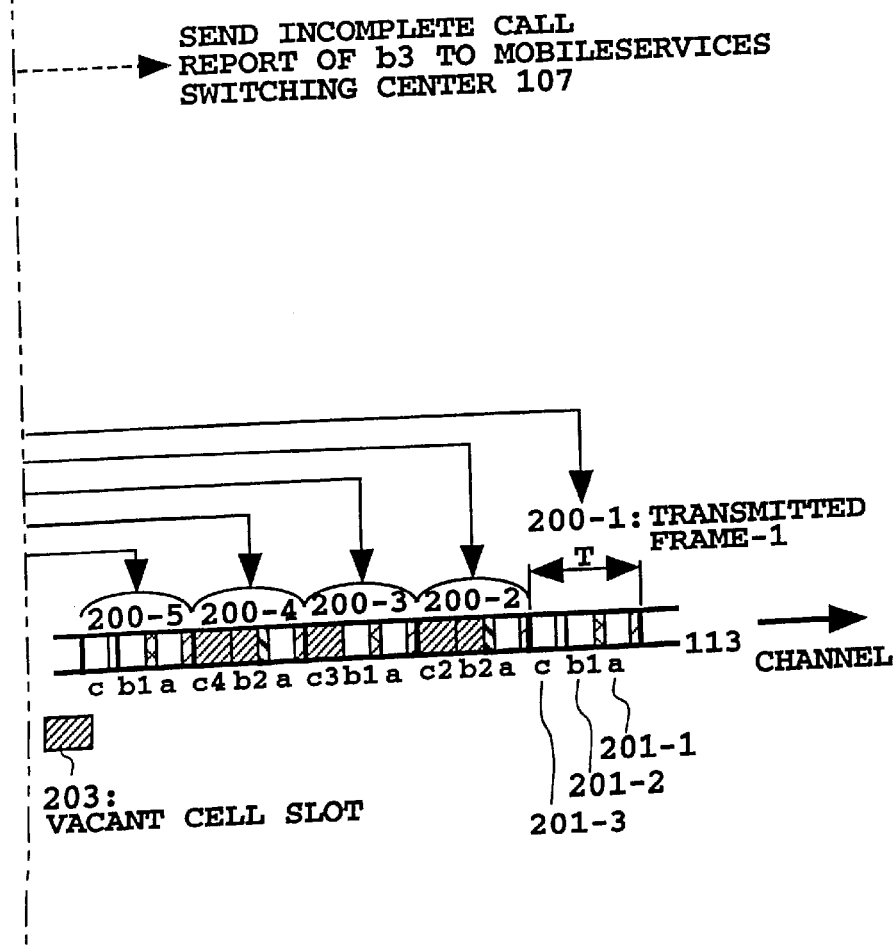

FIGS. 9A and 9B are diagrams illustrating the transfer algorithm when the present embodiment is applied to one call for each different call type. This embodiment also applied to the configuration of the mobile communication system as shown in FIG. 1.

In FIGS. 9A and 9B, the reference numeral 200 designates transmitted frames which accommodate a fixed number of cell slots 201 and shared cell slots 203, and are transferred at the fixed interval T. The reference numeral 201 designates cell slots reserved in advance for transmitting the ATM cells conveying the respective call types. The reference numeral 203 designates shared cell slots used instead of the cell slots 201 when the cell slots 201 have already been used up for transmitting the call type when the call occurs. The reference numeral 204 designates an ATM cell for carrying a priority call, and 205 designates an ATM cell for carrying a non-priority call.

The identifying method of the priority and non-priority ATM calls will now be described.

It is possible for the ATM cell assembler/disassemblers 103 in the base station 101 and the ATM cell assembler/disassemblers 109 in the mobileservices switching center 107 in FIGS. 2A and 2B to decide whether the information in the ATM cells exchanged to one another indicates the priority call or non-priority call at the step of establishing communications. The ATM cell assembler/disassemblers 103 and 109 set the CLP identifier 401 in FIG. 8 to "0" when transmitting the priority call, and to "1" when transmitting the non-priority call.

The transmitted frame assembler/disassembler 104 decides whether the information carried by the ATM cell indicates the priority call or non-priority call by checking the CLP identifier 401 in the ATM header.

Other methods capable of identifying the priority call and non-priority call can also be applied to the present invention as long as they can decide the priority in the transmitted frame assembler/disassembler 104.

The operation of the embodiment which makes priority decision using the CLP identifier will now be described with reference to FIGS. 9A and 9B.

The conditions of the call types a, b and c are the same as those of the embodiments as shown in FIGS. 4–7.

Accordingly, when the transfer period of the call type a is T, the call types b and c can be transmitted at intervals equal to twice and four times the period T, respectively. This can be implemented as in the embodiments shown in FIGS. 4 and 6 by preparing the transmitted frames 201 each consisting of the cell slots 201-1, 201-2 and 201-3 for transferring the respective call type cells, and by scheduling the transmitted frames such that they are sent over the channel 113 at every interval T without delay.

In FIGS. 9A and 9B, one call per call type a, b or c is assumed as in FIGS. 4 and 6. If a new call occurs for the call types b and c, a shared cell slot 203 is reserved to transfer the new call as in FIG. 5. This enables the new call to be transferred without delay as in the embodiment 2 shown in FIG. 5.

Let us assume, as shown in FIGS. 9A and 9B, that the number of cell slots available for the call type a is one, that for the call type b is one, and that for the call type c is four, and that the number of the shared cell slots available for the ATM cell transfer is one.

It is further assumed that new calls b2 and b3 occur as shown in FIGS. 9A and 9B, and that the call b2 is a priority call and the call b3 is a non-priority call. In this case, the ATM cell assembler/disassemblers 103 in FIGS. 2A and 2B assign information to the CLP 401 in the ATM headers in the ATM cells for transmitting the respective calls such that the priority and non-priority can be identified.

The transmitted frame assembler/disassembler 104 checks the CLP 401 of the ATM cells 204 and 205 sent out of the ATM cell assembler/disassemblers 103, assigns the shared cell slot to the ATM cell 204 carrying the priority call, and provides the mobile station 100 and mobileservices switching center 107 with the incomplete call report of the call b3 because the cell slot cannot be assigned to the ATM cell 205 for transmitting the non-priority call.

In this embodiment, a shared cell slot is assigned to an overflowed call in accordance with its priority when the number of calls exceeds the number of available shared slots prepared in the shared cell slots, thereby being transmitted in preference. This makes it possible to reduce the probability that the priority call ends with an incomplete call.

FIGS. 10A and 10B are diagrams illustrating extended transmission algorithm applied to a plurality of calls for each of the different call types. In FIGS. 10A and 10B, the reference numeral 300 designates transmitted frames which accommodate the same number of cell slot groups 301 and shared cell slot groups 303 as that of the call types, and which are transferred at the fixed interval T. The reference numeral 301 designates cell slot groups each consisting of a plurality of consecutive cell slots reserved in advance for transferring the ATM cells conveying the respective call types. The reference numeral 303 designates shared cell slot groups used instead of the cell slot groups 301 when there is no vacant cell slot because the cell slot group 301 have already been used which are to be used for transferring the call type at the occurrence of the call. The reference numeral 304 designates an ATM cell group for carrying the priority call, and 305 designates an ATM cell group for carrying the non-priority call.

When handling a plurality of calls per call type, the transmitted frame assembler/disassembler 104 checks the CLPs 401 of the ATM cell groups 304 and 305 sent out of the ATM cell assembler/disassemblers 103 as in the case described in connection with FIGS. 9A and 9B. Then, the shared cell slot group is assigned to the ATM cell group 304 which transfers the priority call. The shared cell slots in the shared cell slot group are assigned to the ATM cell group 305 which carries the non-priority call as much as possible to transfer the calls. With regard to the remaining calls in the ATM cell group 305, the incomplete call report is sent to the mobile station and the mobileservices switching center 107 because the cell slot cannot be assigned to them.

In FIGS. 3–7 and 9A–10B, the algorithms are described for assembling the transmitted frame in the transmitted frame assembler/disassembler 104 of the base station. Like operations are also carried out in the transmitted frame assembler/disassembler 105 of the mobileservices switching center.

Thus, a shared cell slot is assigned to an overflowed call in accordance with its priority when the number of calls exceeds the number of available shared slots prepared in the shared cell slot groups, thereby being transmitted in preference. This makes it possible to reduce the probability that the priority call ends with an incomplete call.

As described above, the present invention enables multiple connections of cells of the same call types or of cells bearing different call type information with different information transfer rates to be sent periodically without delay by means of particular cell slot groups, thereby improving the communication quality.

Furthermore, the present invention can increase the information transmission efficiency by handling overflowed calls such that they do not end with an incomplete call even when the number of calls exceeds the number of cell slots prepared in the cell slot group for each call type.

Moreover, the present invention can reduce the probability that the priority call ends with an incomplete call by assigning a shared cell slot to an overflowed call in accordance with its priority when the number of calls exceeds the number of available shared cell slots prepared in the shared cell slot group.

What is claimed is:

1. A communication apparatus for transmitting information using fixed length cells, comprising:
   means for generating, when there are a plurality of calls to be handled and there are at least two different information transfer rates in information transfer rates required of the plurality of calls, fixed length cells bearing information of each of the plurality of calls, at a period of a value which is inversely proportional to the information transfer rate required of the call;

means for preparing frames, each of the frames having cell slots the number of which is equal to the number of the plurality of calls, and a transfer period of the frames being equal to the minimum value of the values which are inversely proportional to the information transfer rates required of the plurality of calls;

means for mounting the generated fixed length cells on the cell slots of the prepared frames; and means for carrying out periodic transfer of the frames in which the fixed length cells have been mounted on the cell slots.

2. The communication apparatus as claimed in claim 1, wherein said fixed length cells are ATM cells.

3. The communication apparatus as claimed in claim 1, wherein the information transfer rates required of said plurality of calls are different from each other.

4. The communication apparatus as claimed in claim 1, further comprising means for transferring, when a new call occurs, fixed length cells bearing information of the new call by using vacant cell slots in said frames as shared cell slots.

5. The communication apparatus as claimed in claim 4, further comprising means for assigning said shared cell slots to new calls based on priorities of the new calls.

6. The communication apparatus as claimed in claim 1, wherein said communication apparatus is a mobileservices switching center.

7. The communication apparatus as claimed in claim 1, wherein said communication apparatus is a base station.

8. A communication method for transmitting information using fixed length cells, comprising the steps of:

generating, when there are a plurality of calls to be handled and there are at least two different information transfer rates in information transfer rates required of the plurality of calls, fixed length cells bearing information of each of the plurality of calls, at a period of a value which is inversely proportional to the information transfer rate required of the call;

preparing frames, each of the frames having cell slots the number of which is equal to the number of the plurality of calls, and a transfer period of the frames being equal to the minimum value of the values which are inversely proportional to the information transfer rates required of the plurality at calls;

mounting the generated fixed length cells on the cell slots of the prepared frames; and carrying out periodic transfer of the frames in which the fixed length cells have been mounted on the cell slots.

9. The communication apparatus as claimed in claim 8, wherein said fixed length cells are ATM cells.

10. The communication method as claimed in claim 8, wherein the information transfer rates required of said plurality of calls are different from each other.

11. The communication method as claimed in claim 8, further comprising the step of transferring, when a new call occurs, fixed length cells bearing information of the new call by using vacant cell slots in said frames as shared cell slots.

12. The communication method as claimed in claim 11, further comprising the step of assigning said shared cell slots to new calls based on priorities of the new calls.

* * * * *